United States Patent
Kennedy et al.

(10) Patent No.: US 9,148,808 B2
(45) Date of Patent: Sep. 29, 2015

(54) ADAPTIVE RF SYSTEM TESTING SYSTEM AND METHOD

(71) Applicant: Echo Ridge LLC, Sterling, VA (US)

(72) Inventors: Joseph P. Kennedy, Great Falls, VA (US); John P. Carlson, Sterling, VA (US)

(73) Assignee: Echo Ridge LLC, Sterling, VA (US)

( * ) Notice: Subject to any disclaimer, the term of this patent is extended or adjusted under 35 U.S.C. 154(b) by 94 days.

(21) Appl. No.: 13/691,154

(22) Filed: Nov. 30, 2012

(65) Prior Publication Data

US 2014/0154995 A1    Jun. 5, 2014

Related U.S. Application Data

(60) Provisional application No. 61/629,922, filed on Dec. 1, 2011.

(51) Int. Cl.
| | |
|---|---|
| *H04B 17/00* | (2015.01) |
| *H04W 24/06* | (2009.01) |
| *H04B 17/14* | (2015.01) |
| *H04B 17/391* | (2015.01) |
| *H04B 17/10* | (2015.01) |

(52) U.S. Cl.
CPC .............. *H04W 24/06* (2013.01); *H04B 17/14* (2015.01); *H04B 17/3912* (2015.01); *H04B 17/101* (2015.01)

(58) Field of Classification Search
CPC ....................................................... H04B 10/07
USPC ................. 455/67.11, 115.1, 226.1, 423, 424
See application file for complete search history.

(56) References Cited

U.S. PATENT DOCUMENTS

| | | |
|---|---|---|
| 5,794,128 A | 8/1998 | Brockel et al. |
| 5,917,449 A | 6/1999 | Sanderford et al. |
| 6,094,168 A | 7/2000 | Duffett-Smith et al. |
| 6,275,705 B1 | 8/2001 | Drane et al. |
| 6,393,292 B1 | 5/2002 | Lin |
| 6,492,945 B2 | 12/2002 | Counselman, III et al. |
| 6,522,890 B2 | 2/2003 | Drane et al. |
| 6,571,082 B1 | 5/2003 | Rahman et al. |
| 6,865,395 B2 | 3/2005 | Riley |
| 6,978,131 B1 | 12/2005 | Lee |
| 7,035,650 B1 | 4/2006 | Moskowitz et al. |
| 7,171,345 B2 | 1/2007 | Mocek |
| 7,398,086 B2 | 7/2008 | Morgand et al. |
| 7,620,368 B2 | 11/2009 | Wang et al. |
| 7,773,995 B2 | 8/2010 | Rappaport et al. |
| 8,000,656 B1 | 8/2011 | Jiao et al. |

(Continued)

FOREIGN PATENT DOCUMENTS

| | | |
|---|---|---|
| WO | 2007113086 A1 | 10/2007 |
| WO | 2008119635 A1 | 10/2008 |
| WO | 2009112293 A1 | 9/2009 |

OTHER PUBLICATIONS

Derek Kurth, "Range-Only Robot Localization and SLAM with Radio", Robotics Institute, Carnegie Mellon University, May 2004. 60pgs.

*Primary Examiner* — Tuan H Nguyen
(74) *Attorney, Agent, or Firm* — Duane Morris LLP

(57) ABSTRACT

A system and method for testing an adaptive RF system in an emulated RF environment using a feedback control module to efficiently and accurately evaluate the performance of the RF system under test in the search space.

16 Claims, 8 Drawing Sheets

(56) References Cited

U.S. PATENT DOCUMENTS

| | | |
|---|---|---|
| 8,018,383 B1 | 9/2011 | Schantz et al. |
| 8,086,187 B1 | 12/2011 | Davis et al. |
| 8,126,453 B2 | 2/2012 | Wang |
| 8,229,416 B2 | 7/2012 | Akman et al. |
| 8,270,910 B2 | 9/2012 | Picard |
| 8,332,198 B1 | 12/2012 | Barclay et al. |
| 8,339,142 B2 * | 12/2012 | Oowada ............... 324/537 |
| 2002/0160717 A1 | 10/2002 | Persson et al. |
| 2005/0085223 A1 | 4/2005 | Liu |
| 2005/0200525 A1 | 9/2005 | Duffett-Smith et al. |
| 2005/0260962 A1 | 11/2005 | Nazrul et al. |
| 2006/0094365 A1 | 5/2006 | Inogai et al. |
| 2006/0128315 A1 | 6/2006 | Belcea |
| 2006/0148429 A1 | 7/2006 | Inogai et al. |
| 2006/0174162 A1 | 8/2006 | Varadarajan et al. |
| 2006/0229018 A1 | 10/2006 | Mlinarsky et al. |
| 2006/0229020 A1 | 10/2006 | Mlinarsky et al. |
| 2007/0019769 A1 * | 1/2007 | Green et al. ............ 375/360 |
| 2007/0072552 A1 | 3/2007 | Jonsson et al. |
| 2007/0127559 A1 | 6/2007 | Chang et al. |
| 2007/0223571 A1 | 9/2007 | Viss |
| 2008/0026748 A1 | 1/2008 | Alexander et al. |
| 2008/0057873 A1 | 3/2008 | Huang et al. |
| 2008/0084951 A1 | 4/2008 | Chen et al. |
| 2009/0094492 A1 | 4/2009 | Music et al. |
| 2009/0113245 A1 | 4/2009 | Conner |
| 2009/0213828 A1 | 8/2009 | Brundage et al. |
| 2009/0233621 A1 | 9/2009 | Rhoads et al. |
| 2010/0062722 A1 | 3/2010 | Dykema et al. |
| 2010/0099361 A1 | 4/2010 | Lundstrom et al. |
| 2011/0124295 A1 | 5/2011 | Mahjoubi Amine et al. |
| 2011/0136457 A1 | 6/2011 | Yu |
| 2011/0223869 A1 | 9/2011 | Harteneck |
| 2011/0287721 A1 | 11/2011 | Haran |
| 2011/0306306 A1 | 12/2011 | Reed |
| 2012/0071107 A1 | 3/2012 | Falck et al. |
| 2012/0225624 A1 | 9/2012 | Kyosti et al. |
| 2013/0029608 A1 * | 1/2013 | Kuo et al. ............ 455/67.11 |
| 2013/0231060 A1 | 9/2013 | Ozaki et al. |
| 2014/0051363 A1 | 2/2014 | Kennedy et al. |

* cited by examiner

ADAPTIVE RF SYSTEM TESTING SYSTEM AND METHOD

The present application claims the priority of U.S. Provisional Patent Application Ser. No. 61/629,922 filed Dec. 1, 2011, the disclosure of which is hereby incorporated by reference.

The present disclosure relates to the field of functional and performance testing of adaptive or cognitive RF systems. More specifically, this disclosure describes a system and method for efficiently and effectively testing adaptive RF systems in the laboratory where a methodology is used to produce field-quality valid results with a limited number of trial scenarios controllable in a laboratory environment.

BACKGROUND

Radio spectrum is scarce and the FCC, DoD and other international spectrum management organizations are constantly looking for ways to more efficiently utilize this limited spectrum. Demand for spectrum is continuing to rise due to the explosive growth of data, voice, messaging, and video applications. One solution to meeting the need for improved spectral efficiency as measured by bits/Hz/user is adaptive radios (also referred to as dynamic spectrum access (DSA) or cognitive radios (CR)). Adaptive radios can change their transmission characteristics to maximize transmission capacity and coverage while conserving spectral usage.

One of the challenges of deploying adaptive radio technology is that it cannot be fielded without comprehensive testing, and it cannot be tested in a densely RF system populated, live environment for fear of potentially interfering with existing spectrum users (primary users). Field testing is preferable to lab testing but requires a realistic environment where it can be verified that the System under Test (SUT) will not interfere with primary users or other spectrum users. Laboratory testing is more cost and schedule effective, repeatable, controllable and observable, but generally lacks in realism, especially with respect to RF environmental considerations.

There is an established and growing need to comprehensively test and evaluate performance of these new adaptive devices/systems in known and postulated environments to establish behavior characteristics ("average behavior") and reduce unintended field behavior risk ("abhorrent" or "rare event" behavior). Traditional test methods are increasingly stressed by the proliferation and diversity of the devices/systems and operating environments. As used in this application, RF system include RF devices, such as a transmitter, receiver or navigation device, as well communication systems, navigation systems, radar systems or other systems using transmitters or receivers. As used in this application, testing means evaluating input and output parameters for an RF system across a parameter search space in an RF environment in order to determine the behavior characteristics of the RF system. Historically, RF system testing has fallen into two broad categories, field testing and laboratory simulation/testing. Field testing as illustrated in FIG. 1 involves placing some number of devices in a realistic field environment and exercising them to test performance against specified functionality. Full-featured field tests place the wireless transceivers in a field scenario containing some representative RF environment where they will be operated while test data is collected. These sorts of tests are often expensive and complex to orchestrate, and can lack flexibility since mixes of test transceiver numbers/types/locations, incumbent RF user numbers/types/locations and RF propagation conditions cannot be systematically varied to collect comprehensive data.

FIG. 1 schematically depicts a typical field test equipment setup. Wireless Transceiver Units Under Test (UUT) 100 operate in some RF environment 110. The RF emissions are subject to the noise, path loss, multipath transmission and interferers found in the local RF environment. Test instrumentation 120 is established to measure the performance of the UUT and other PU of the RF environment. In order to accomplish a field test of this variety, the UUT must be physically located in the test RF environment, and test instrumentation must be constructed. In order to vary the numbers/types/locations of UUT and PU, physical units must be acquired and placed in the RF environment. In order to vary the RF environment, different field venues must be available. Additionally, test instrumentation must be provided and adapted for each UUT/PU/test environment scenario where testing is to be accomplished.

Many factors must be considered when selecting and configuring the field test area including the specific type and host platform for the Systems Under Test (SUT), the characteristics and quantity of other RF interferers in the environment, and environmental factors that affect the radio propagation including terrain and morphology. Field test methods have been viewed as the most realistic, but many growing challenges limit their ability to be compelling. These challenges include:

Difficulty and complexity in testing high platform dynamic systems

More devices/systems to test

More functionality & complexity to test including adaptive/cognitive behavior

Test ranges require a broad set of realistic physical layouts

Requirements to emulate location-specific RF environments including propagation and interferers Requirements for conditions not realizable on test ranges including prohibition by FCC rules RF environment control difficult due to encroachment of commercial RF sources.

All of above lead to increased costs, longer schedules, more requirements on field test assets and ranges, and potentially lower confidence in results. For adaptive RF systems, field testing is not practical. Laboratory test methods are generally more cost and schedule effective, are more controllable and observable, but generally are lacking in realism, especially with respect to RF environmental considerations.

There exist many variations of lab testing approaches, but they can be generally bounded by "RF Path Simulator" and "Software Modeling" variants. The RF Path Simulator approach shown in FIG. 2, which interconnects RF systems/devices with conventional laboratory test equipment such as signal/noise generators, is only applicable to simple RF environments, small numbers of devices/systems under test with simple antenna systems, and small number of primary users/interferers. Lab-based testing using cable-based interconnection for RF emissions of UUT and the RF environment is a prior art approach to testing to overcome the challenges of placing and monitoring devices in the field environment. FIG. 2 depicts a typical lab-based equipment setup. As in field testing, Wireless Transceiver Units Under Test (UUT) 100 are acquired and instrumented with Test Instrumentation 120. Instead of the RF environment being that found in the field, RF test equipment such as signal generators are used to produce Interferers 210, Noise Generators 220, and Path Simulators 200 to simulate path loss and multipath in an RF channel. RF Interconnection 230 is accomplished using RF cables such as coaxial cables. This test set up approach reduces some of the complexities of field testing, but introduces new concerns over RF environment realism. Further, it still requires the physical introduction of new UUT and RF test equipment into the configuration for comprehensive transceiver configuration and RF environment results.

Traditional software modeling approaches as shown in FIG. 3 have historically made simplifications about the physical environment/radio propagation effects, and generally cannot support any hardware in the loop (HITL) test cases. Their validity is therefore limited to a narrow group of test cases and not well suited to the adaptive RF system test problem. A variation on RF cable-connected lab testing has become more prevalent and straightforward as wireless transceiver devices have tended towards digital waveforms and digital hardware or software implementation. FIG. 3 depicts a typical framework for modern wireless communications devices as defined by the prior art OSI model. Here, different functions in the Wireless Transceiver 100 are allocated to layers in the functional stack 300. The physical layer in stack 300 is where the waveform-related functionality is contained. The physical layer can be segregated into a digital implementation portion 310 and an analog portion 320. Typical functions in the digital transmit portion 310 are waveform generation and digital to analog conversion. Typical functions found in the analog portion 320 are baseband to RF conversion. Other digital processing functions associated with non-physical layers (2 through 7) are performed through digital data processing blocks 330.

A laboratory-based testing approach that combines the advantages of true RF path/environment emulation and HITL, but implemented in the digital domain under software control, has the potential to deliver the advantages of the different lab methods with the realism of field testing. The test platform disclosed in commonly owned U.S. patent application Ser. No. 12/787,699, titled "Wireless Transceiver Test Bed System and Method", which is hereby incorporated by reference, follows this approach. The present disclosure adds improvements directed to a method to control the RF environment to execute a sufficient number of test cases for validity and schedule the test cases so that a limited number are required for execution. This facet of the test bed problem is further described below.

Perhaps the most challenging part of adaptive RF system testing is addressing the vast number of test cases that may have to be scheduled to comprehensively test an adaptive RF system. To illustrate the magnitude of the problem, an example test scenario for an adaptive navigation receiver is presented. The test conditions can be grouped into 5 categories, each with a large number of individual parameters as follows:
  1. GNSS Signals (# systems, # satellites, positions of satellites, status of satellites (i.e. health, accuracy of correction data, etc.))
  2. Interference Signals (#, type, position, characteristics)
  3. Augmentation (existence, types, characteristics of types (including the following))
     a. Other RF Source Augmentation (i.e. Signals of Opportunity)
     b. Mechanical Augmentation (i.e. IMU)
     c. Correction Augmentation (i.e. WAAS)
     d. Assist Augmentation (i.e. A-GPS)
     e.
  4. Propagation Environment (GNSS to PNT, Interference to PNT, Augmentation to PNT (if applicable))
  5. PNT System Configuration (host platform considerations (varies by host platform), orientation to sources (up to 6 degrees of freedom), # RF channels, antenna systems, user configurable parameters.

It can be easily envisioned that the number of test cases could routinely reach into the millions (or higher for more complex RF system types). Two challenges result from this condition. First, the time and associated cost of performing the test may be prohibitive. Second, the vast amount of data produced by comprehensive testing may make useful conclusions about the performance difficult or impossible to formulate. A desirable capability of the test asset would be a test methodology that significantly reduced the number of tests run while maintaining the validity of the data (the ability to extract the performance characteristics of the RF system under test).

Based on a review of the available RF system test beds that exist in industry and academia (including those referenced in U.S. patent application Ser. No. 12/787,699), a wireless transceiver test bed approach, capable of efficiently producing valid performance test data, and yet is scalable, flexible and affordable is not known.

The present disclosure utilizes emerging technologies and trends in the areas of optimal search algorithms, digital signal processing, wireless device design, wideband networks, computer and software architecture/capability and software-based modeling to provide a means to address these shortcomings. Specific technology innovations that contribute to various aspects of the present disclosure include:
  digital signal processing power and available algorithms and models
  ability to digitize RF with high fidelity
  emerging software defined radio (SDR) software architectures, such as SCA (Software Communications Architecture)
  emerging commercial off-the-shelf digital radio and SDR components (hardware and software)
  ever increasing broadband connectivity between distributed sites
  comprehensive and advanced RF propagation models
  RF emitter models being built in software
  proliferation of radio functionality being digital and implemented in software with discrete events (bits, bursts, frames, etc.).
  standardization of baseband digitized interfaces to SDRs (such as the VITA-49 Radio Transport Protocol)
  optimal search algorithms including multi-queue branch and bound algorithms.

The present disclosure is not limited to adaptive wireless devices in the application area of communications, but broadly applies to all wireless devices and networks including receive only, transmit only and diverse applications such as sensing, radar, and jamming. Further, it is not limited to testing adaptive RF systems and could also be used to automatically test conventional RF systems. The same properties of effectively and efficiently testing apply in that the test system would automatically produce valid results using a reasonable number of RF environment scenarios.

SUMMARY OF DISCLOSURE

In one embodiment, the disclosed system uses a closed loop architecture that creates a realistic radio environment allowing the adaptive radio or SUT to be fully stimulated under realistic and repeatable conditions and then monitors how the SUT behaves and/or adapts. In this architecture shown in FIG. 4, the total number of different test conditions are far too great to exhaustively test all combinations, i.e. number and type of emitters each with varying parameters (frequency, power level, modulation, etc.), different propagation paths considering various terrain and morphology, different physical locations of the RF systems, and stationary and mobile systems at different elevations. The total number of test combinations could be in the many millions which makes exhaustive testing impractical.

To address this challenge, the architecture includes a feedback control module 400 that uses the behavior, including adaptive behavior of the RF system under test (SUT) to intelligently tailor the RF environment in response to how the SUT 430 behaves in order to focus on RF environmental conditions that cause the radio to adapt. The adaptive nature of the system under test provides a means for the RF environment to be dynamically changed during testing and does not require the use of a priori information. For example, the RF environment module 420 can control the number and type of emitters (including the system under test and interferers), the propagation characteristics taking into account terrain and morphology, various physical layouts and the effects of movement of emitters and/or receivers. One objective of the control system is to minimize the number of trials that are required to fully characterize the SUT 430 to a given confidence level.

The system under test 430 can be a physical system, or can be implemented in software from instructions retrieved from memory (not shown) to emulate an actual RF system. RF environment module 420 is implemented in software from instructions retrieved from memory (not shown) in response to control instructions from a feedback control module 400. Test module 410 receives input from the RF environment module 420 and RF system under test module 430. Test module 410 records observations and makes measurements of the parameters associated with the RF system under test 430 and stores them in a memory. Feedback control module 400 evaluates the test results of the test module 410 and makes decisions and controls the RF environment by providing input to RF environment module 420. The feedback control module 400 can characterize the adaptive performance of the system under test 430, and identify average and rare-event behavior. Average behavior is defined as the dominant behavior or adaptation modes of the SUT. Included in this definition would be the behavior exhibited by the SUT under typical environmental conditions. Average behavior characterization may be desirable when the objective is to understand the typical performance characteristics of an RF-based navigation device (i.e. GPS receiver). Rare-event behavior is defined as low probability behavior, typically triggered by unusual environmental circumstances. An example of rare-event behavior would be when a cognitive radio becomes confused by unusual and rapidly changing spectrum conditions and begins to transmit in known primary user spectrum. Rare-event behavior characterization is valuable to understand the likelihood of a cognitive radio creating interference for primary users.

The feedback control module 400 can use an optimization criteria to determine an adequate characterization of the system under test using the minimum number of samples or trials. Further, feedback control module 400 can determine the sufficiency of the evaluation and the need for further testing suing a confidence level, costing function, or other objective criteria. In one embodiment, the feedback control module 400 can determine a gradient between parameters across the search space. The gradient between parameters can be used to divide the search space into a plurality of subspaces and the feedback control module can control the RF environment module to direct further testing on only specified subspaces that provide the most useful information.

In one embodiment, characterization is achieved by varying the RF environment in which the SUT operates in order to characterize performance across this "search space". The algorithm includes the concept of scheduling in the sense that tests will need to be performed on the SUT in a time-serial fashion, and test cases (different combinations of environment and SUT configuration parameters) can be scheduled in different orders/combinations by the algorithm to achieve some goal. A brute force approach would be to vary each parameter across all combinations to measure performance. This is at least inefficient and likely not practical as the number of parameters and range of values is extremely large.

Returning to the purpose of the scheduling algorithm, efficiency can be defined as minimizing the "cost" of performing the testing. The total cost can be defined as the total time to do the testing. The time to do the testing can be defined as the number of tests times the time to do a particular test. The time to do a test will depend on which environment or SUT configuration parameters are in play. For example, changing a mechanical parameter related to the inertial measurement unit (IMU) in an adaptive navigation device will likely take longer than an RF parameter such as changing an attenuation value. The equation for cost is defined as $C=\Sigma_{n=1}^{N}T(n_X)$, where C is the total cost (or time), n is the trial number, N is the total number of trials, and $T(n_X)$ is the time required for a specific trial given the set of X independent variables. Validity of the results can be defined as results that provide the same information as if the entire parametric space (environment variables and SUT configuration variables) were tested. In this case, the goal is to test a subset of all possible test cases, and be "confident" that it represents the useful information contained in the exhaustive test case.

DETAILED DESCRIPTION

Figure 6:
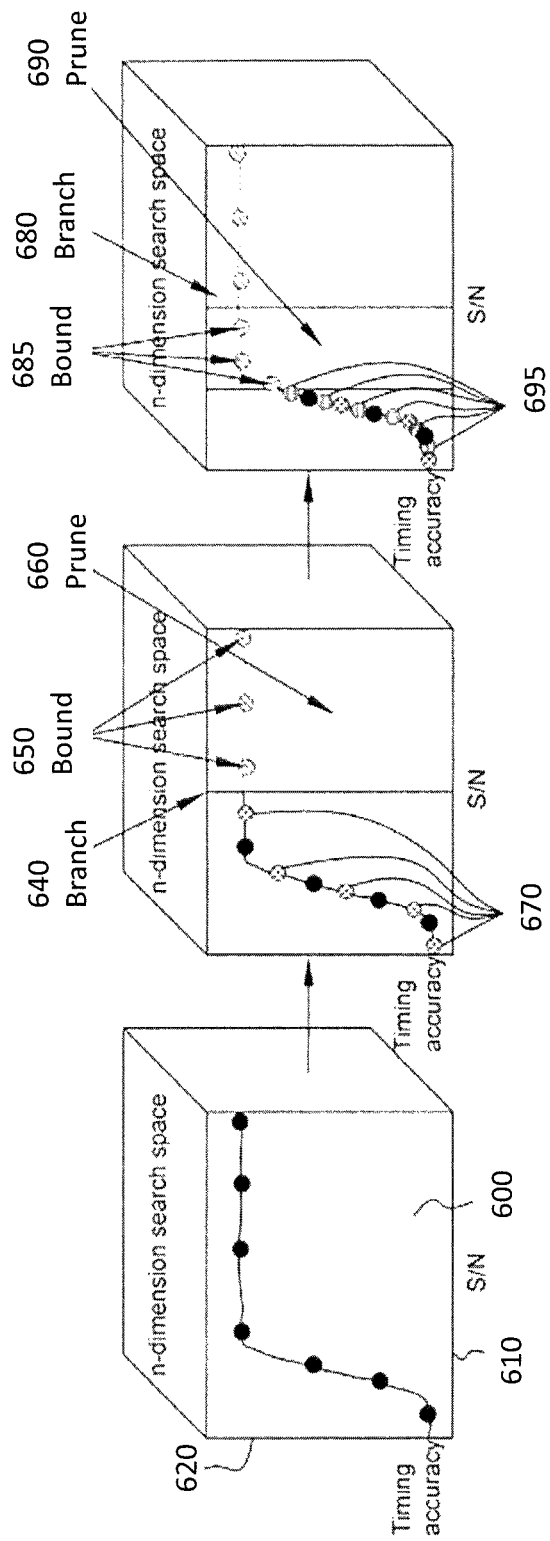
FIG. 6 illustrates a simplified pictorial representation of one embodiment of a branch and bound algorithm applied to a timing-based navigation application.

An insightful description for the adaptive RF system testing methodology to test a subset of all possible test cases, and be "confident" that it represents the useful information contained in the exhaustive test case. Returning to the navigation device test scenario provides a means to illustrate this further in one embodiment of the system. As an example, suppose the dependent variable (what performance is being measured at the SUT) is GPS pseudo-range for a satellite, and the independent variable is S/N ratio at the SUT antenna. Assuming the navigation device is attempting to acquire the C/A code using a 10 ms coherent integration period, we know that at S/N ranges of approximately −30 dB S/N or less will be unreliable. Conversely, at S/N values of −20 dB and above should be very reliable. Across these low and high ranges, there is little information provided in taking multiple measurements. Of course, between these ranges (−30 to −20 dB S/N) there is a great deal of information about the performance of the SUT because the dependent variable is changing rapidly, and highly granular measurements are appropriate. This concept is shown in FIG. 6.

Figure 1:
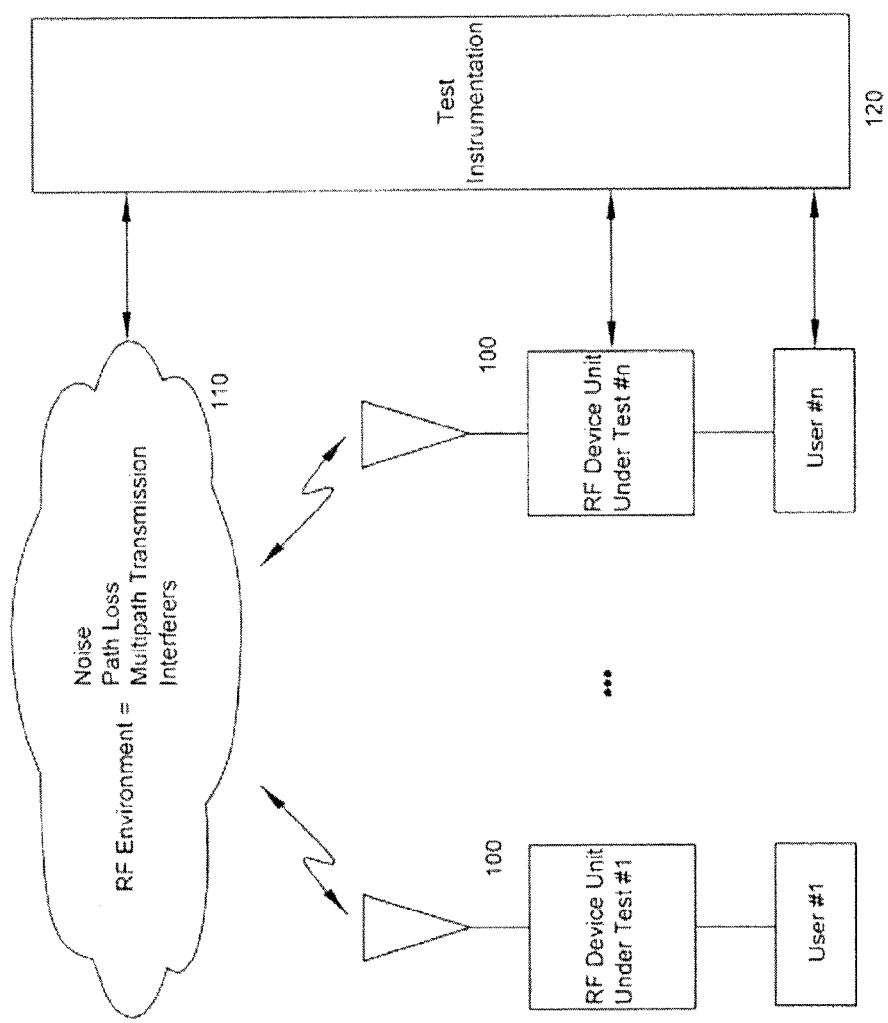
FIG. 1 is a simplified block diagram illustrating the components in a typical prior art field-based testing configuration for an RF device or system.
Figure 2:
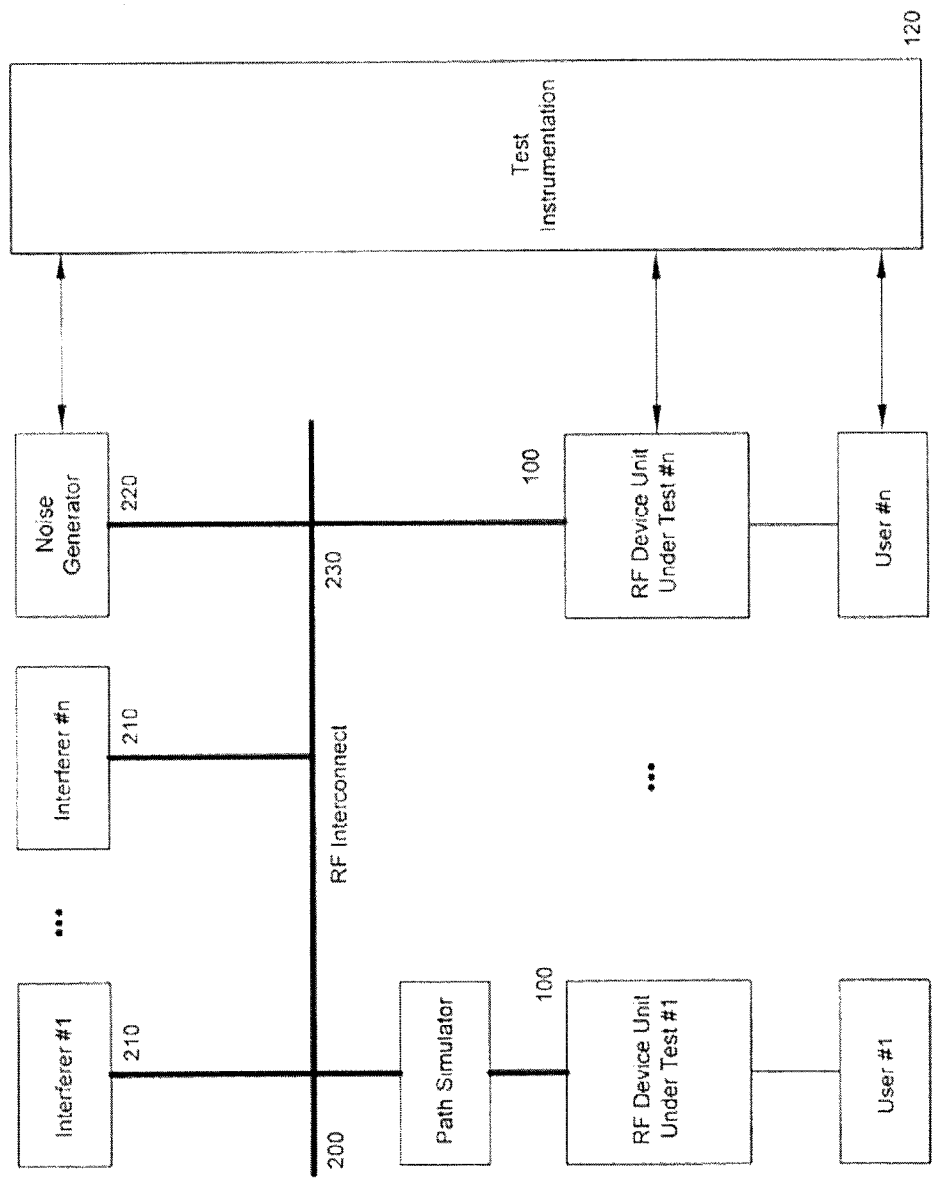
FIG. 2 is a simplified block diagram illustrating the components in a typical prior art RF interconnected laboratory-based testing configuration for an RF device or system.
Figure 3:
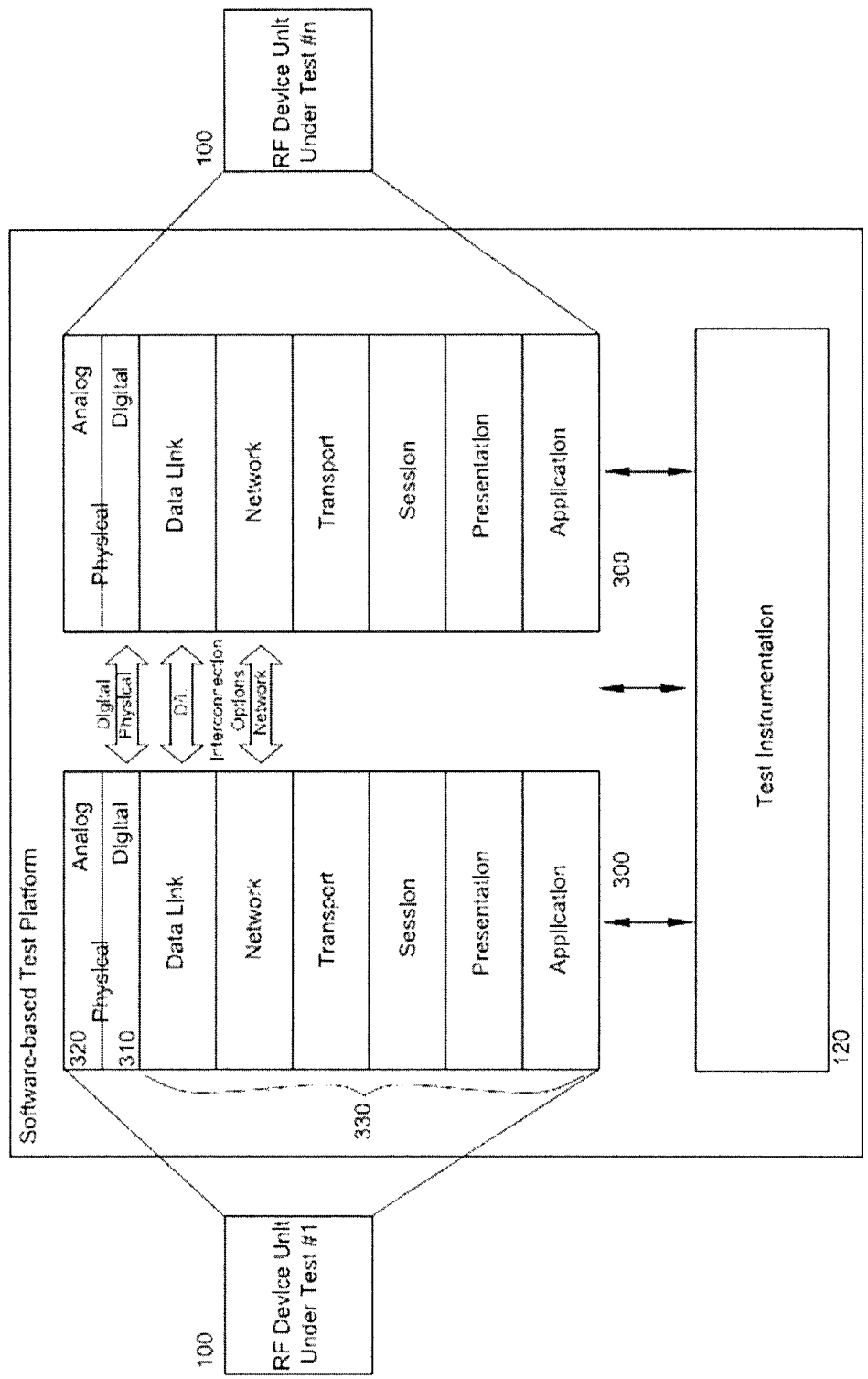
FIG. 3 is a simplified block diagram illustrating the components in a typical prior art software model-based testing configuration for an RF device or system.
Figure 4:
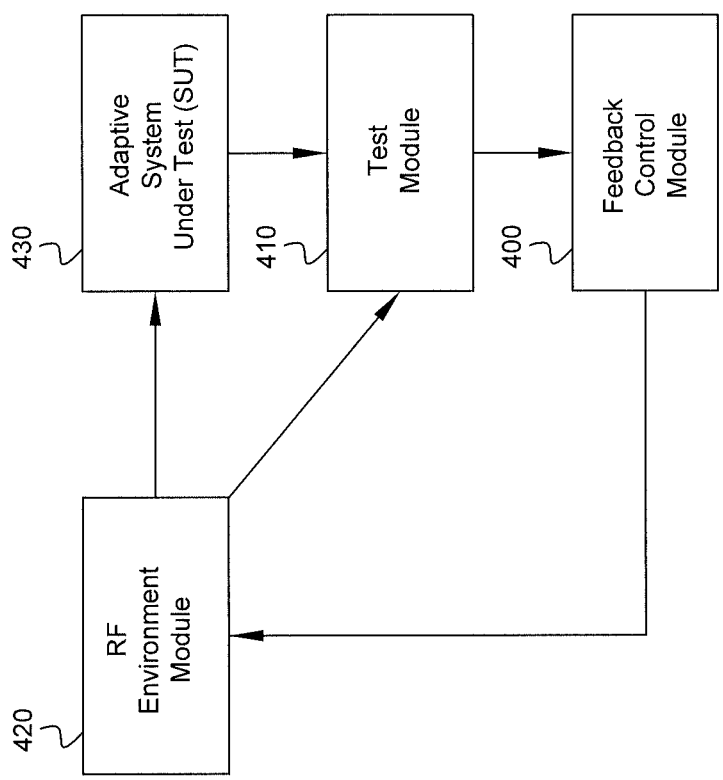
FIG. 4 is a simplified block diagram illustrating one embodiment of a feedback control algorithm to adjust the RF environment based on SUT behavior.
Figure 5:
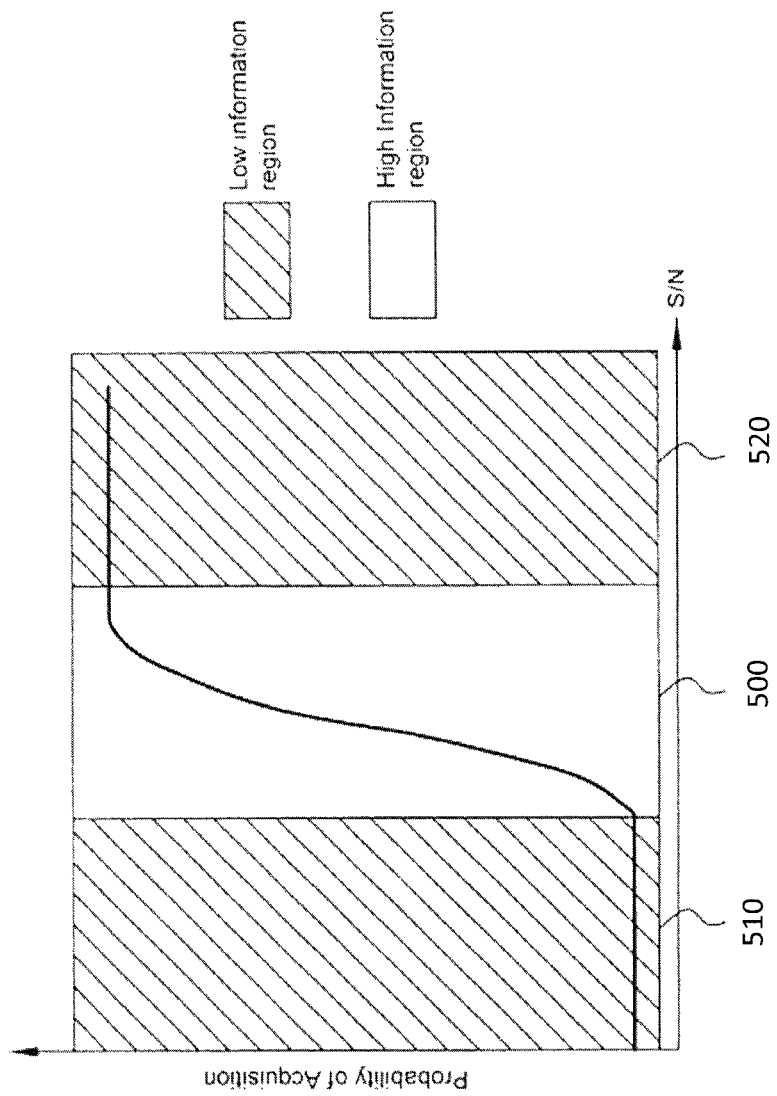
FIG. 5 is a simplified graphical illustration of information regions for one embodiment of a simple one variable case.

In one embodiment, a method of detecting rapidly changing dependent variable regions 500 (vs. relatively static regions 510, 520) is some measure of variance of samples across the region. In this application, the term gradient is used to describe the varying relationship or variance between parameters across a search space. The gradient can be used to determine high information and low information areas. It is therefore a goal of the cognitive scheduling algorithm to schedule tests in these "high information regions" 500 and not test in "low information regions" 510, 520 to produce "validity data". Performing tests in the "low information regions" 510, 520 can be thought of as generating redundant data, and performing tests in the "high information regions" 500 can be thought of as generating non-redundant data. The embodiment in FIG. 5 illustrates a one dimensional test case, and clearly the results apply to multi-dimensional test cases (independent and dependent variables are vectors) with associated exponential cost reduction potential. The problem can be mathematically formulated as follows. The vector Y is a function of N observable dependent variable outputs $y_r$, (accuracy in horizontal and vertical position, speed, time to first fix, etc.)

$$Y = \{y_1, y_2, \ldots y_N\}$$

Each output $y_n$ is a function M independent variable inputs $x_m$ which include environmental effects such as noise power, interference power, direction of interference, terrain, etc. In other words, $$Y = \begin{bmatrix} y_1(X) \\ \vdots \\ y_N(X) \end{bmatrix}, \text{where } X = \{x_1, x_2, \ldots x_M\}$$

For each output $y_n(X)$, the point of maximum "value", or $X_{max}$ in our tests is arg $$\left\{\max_X \left|\frac{\partial y_n}{dX}\right|^2\right\}.$$

Also, for each $y_n(X)$, the "range" of values within X can be identified as lying between:

$$X_{low} = \arg\{g_n|_{X<g_n(X_{max})} < \varepsilon\}, \text{ and } X_{high} = \arg\{g_n|_{X>g_n(X_{max})} < \varepsilon\},$$

$$\text{where } g_n(X) = \left|\frac{\partial y_n}{dX}\right|^2$$

and ε is the threshold in which change in the out value $g_n$ is negligible.

The goal of the optimization is then to converge on a set of test configurations that adequately span the ranges of $X_{low}$ and $X_{high}$ with respect to each of the observable outputs $y_n$. We also wish to further constrain the optimization with two conditions: 1) to avoid duplication of values within X such that the process does not needlessly require repetition of the same set of environment configurations which wastes testing time, and 2) to minimize the "cost" of the overall testing in terms of the previously define cost $C = \Sigma_{n=1}^N T(n_X)$. This leads to the need for an algorithm, or mathematical formulation, and an implementation approach (software based framework) to make the correct scheduling priority decisions. The following discussions describes one embodiment to provide a candidate mathematical formulation based on branch and bound search algorithms, and an implementation approach based on an expert system. Mathematical formulations can be constructed to address different categories of relationships between the dependent and independent variables including deterministic and statistical. They can also be constructed to accommodate RF systems under test that exhibit behavior based on current stimuli plus past stimuli (i.e. systems with memory). Implementation approaches can make different assumptions about a priori knowledge of the RF system under test. For example, the RF system under test can be viewed as a "black box" where there is no a priori knowledge, or a "gray box" where some knowledge of behavior is known, but not with precision. An example of "gray box" knowledge would be that location accuracy of a navigation device improves as a function of increased navigation satellite signal to noise ratio. The existence of a priori knowledge can be used to guide the search algorithms with respect to parameter value ranges and granularities.

Many variations of the Branch and Bound algorithm have been proposed in a wide variety of application fields to solve different types of search problems. The adaptive RF system test problem is somewhat different than most applications of Branch and Bound in that most applications are attempting to efficiently find a point in n-space (vector of dimension n) that meets some criteria for optimality. Adaptive RF system testing is attempting to efficiently span n-space to find all of the points (vectors of dimension n) that are needed to accurately describe the results of testing all of n space. In this embodiment, the Branch and Bound approach has been adapted to apply to this problem. One key change is that all of the results of the testing through the search process form the desired result vs. just the "final" point in space.

The basic approach is to envision an n-dimensional search volume which is divided up into some number of subspaces over time. The algorithm iteratively decides which subspaces to further divide, and which to discard with respect to future action. For the adaptive RF system test application, the search spaces of interest are those where the results of test cases vary within the space (for example, where a small change in S/N creates a large change in the pseudo-range timing measurement), and the search spaces of interest are those where the results of the test cases do not vary (changes in S/N produce little change in pseudo-range time measurement). In the context of the branch and bound algorithm vernacular, splitting search spaces is branching, computing the variability of the test results in bounding, and deciding not to further split a search space is pruning. This process is shown in FIG. 6.

Referring to FIG. 6, the n-dimensional search space is shown as a cube on far left 600. Five major dimensions may be defined for this space, with each dimension have multiple sub-dimensions. For illustration purposes, using the S/N-pseudo-range time measurement example, S/N is varied along the X-axis 610. The measured (dependent) variable is pseudo-range timing accuracy along the Y-axis 620. The branch and bound algorithm would make some number of measurements across the dimension, shown as red dots on the far right cube. The algorithm would split the data into sub-intervals (branch, see center cube 640), then calculate some measure of variability (such as variance) for data in sub-intervals across the dimension (calculated on the solid black and diagonally lined dots in each of the two sub-intervals in the center cube). It would then test the results to see if any sub-interval is to be discarded with respect to future testing (bounding) 650. For example, the sub-interval on the right side of the center cube has been discarded (pruned) 660 for further testing. The algorithm would then make more measurements in the sub-intervals that have not been pruned (shown as crossed hatched dots in the center cube 670). The process repeats as shown in the far right cube. Here, the left half interval of the cube face has been divided (branched) 680, the measurements in each resultant sub-interval have been tested (bounded) 685, and the right sub-interval has been discarded (pruned) 690. The horizontally lined measurement dots 695 are the beginning of the next iteration.

Figure 7:
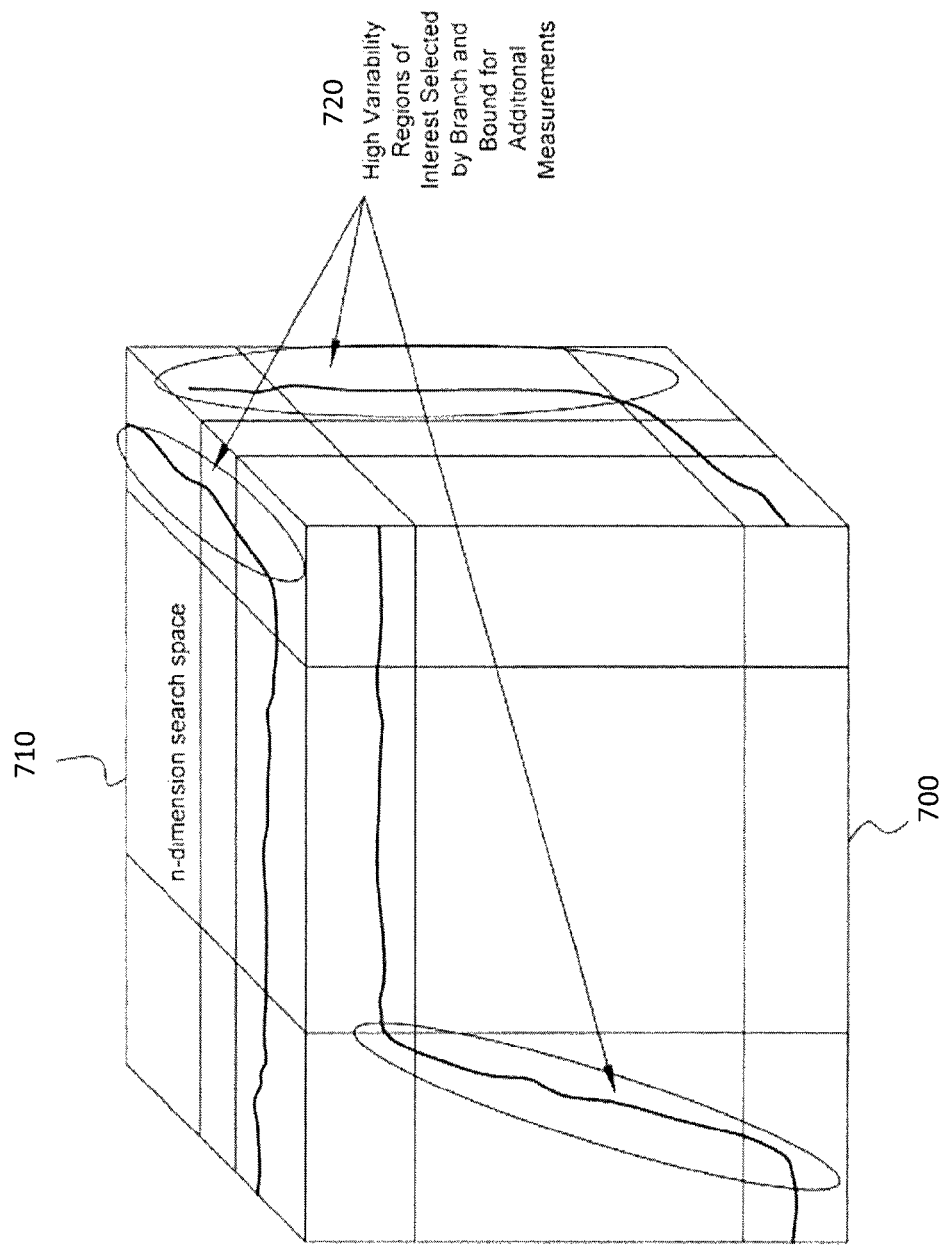
FIG. 7 illustrates a simplified pictorial representation of one embodiment of a branch and bound algorithm applied to a timing-based navigation application in three dimensions.

This simple illustration uses only one dimension in the n-dimensional space. It also assumes the x axis is cardinal, and shows the measurement results are monotonically increasing (which may or may not be true). Relaxation of these simplifications (along with many others) make the search problem more complex. FIG. 7 shows how the Branch and Bound algorithm might operate in 3 dimensions (still a very simple example). Note that on each face of the cube (each dimension 700, 710, 720), decisions are made on how to branch and prune.

Clearly when working in n-space, a joint metric of measurement result variability would be used, and the cost functions previously described would be used in addition to the variability in the bounding step to make pruning decisions and the next branching decisions. One embodiment addresses these conditions, and is based on a branch and bound algorithm that has been described in terms of solving biological problems involving intractable (NP-hard) problems [1]. It uses a multi-queue branch and bound algorithm, and possesses many features including:

Completeness—guaranteed to find an optimal solution if it exists
Optimality—provides global optimum if allowed to run to completion
Anytime—can be stopped at any time and provides a useful result
Irredundant—will find a local minima/maxima only once
Allows admissible heuristics—behavior can be influenced if a priori knowledge about search space exists.

The multi-queue feature is very important for n-dimensional problems and allows multiple subspace (referred to as hyper-rectangles) tests cases to be managed and prioritized through the search process.

The branch and bound embodiment is one of many algorithm alternatives that can be used for the control algorithm function. Algorithms that are designed to estimate average behavior or evaluate rare-event probabilities may be used to detect abhorrent behavior including accommodating variables that are probabilistic vs. deterministic with stochastic modeling.

In one embodiment, the ability of the algorithm to accept a priori knowledge (or learned) is also a key feature. The scheduling of test cases can be influenced by the current knowledge of how adaptive RF systems react to different test stimuli, and by information that is learned as different systems or over time as the subject SUT are tested. The degree to which a priori (or learned knowledge is available to the control algorithm can be categorized as "white", "gray" and "black" box testing. The "box" refers to the SUT, and "white" means that internal control algorithms for the box are completely known, "gray" means they are partially known, and "black" means they are unknown. For example, if it is know that the test results vary in a monotonically increasing way to ordered test stimuli changes ("white" or "gray" case), then the branch process may be able to be applied more efficiently than if the function shape is unknown or with many local maximums and minimums. This learning process may be automated given some of the machine learning (with and without a human in the loop) algorithms that exist in the current art.

The Branch and Bound class of algorithms, as well as other control algorithm embodiments, can be implemented using either a procedural or inferential approach. For the procedural case, simple IF-THEN-ELSE constructs would be used to adapt the behavior of the UE based on measured quantities. For the inferential case, a set of complex rules would be constructed based on expert knowledge to adapt the algorithm behavior. The rules would be scheduled and tested using an inference engine as a function of measurements being made and other conditions in the test fixture. Procedural approaches provide a good solution when the number of measurements and adaptation options are small and unambiguous. Inference engine approaches using rule bases provide a better solution when the combinations of measurements, static conditions and adaptation alternatives become large and unwieldy.

Figure 8:
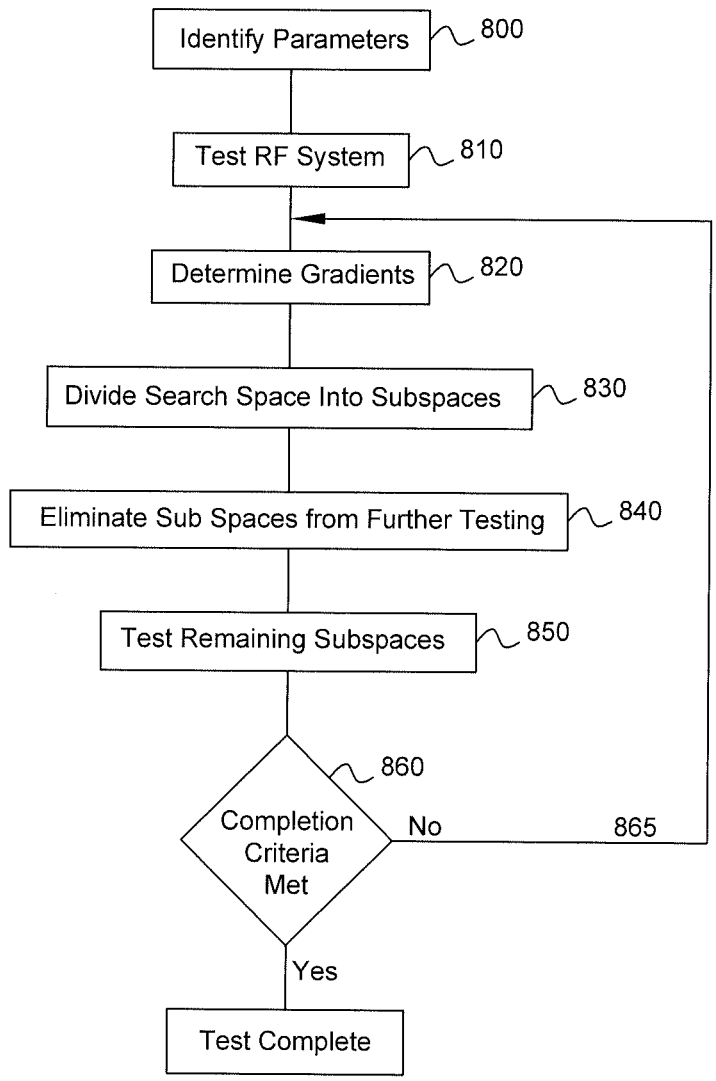
FIG. 8 illustrates a simplified flow diagram of the operation of one embodiment of the present disclosure.

FIG. 8 shows a simplified flow chart of one embodiment of the present disclosure in operation. In step 800, a number of parameters can be identified to evaluate the testing of the RF system across the search space in an emulated RF environment. The RF environment is emulated in software, which allows for changes to be made to the RF environment during testing. In step 810, the testing of the RF system may be accomplished by evaluating the identified parameters across the initial search space. In step 820, a gradient can be determined representing the varying relationship between the identified parameters. The gradient can be used to define areas of high information and distinguish them from areas of low information. Generally, the larger the gradient, the more variance between the parameters, while a lower gradient reflects a lower dynamic relationship between the parameters. For lower gradient regions, less testing is required of this subspace because the test samples provide redundant information due to the lower varying relationship between the tested parameters. On the other hand, subspaces associated with a larger gradient require more test samples in order to accurately describe the more dynamic relationship between the parameters. One goal of this embodiment is to determine areas of high information and direct further testing to the subspace associated with this high information area. Thus, in step 830, the gradient can be used to divide the search space into subspaces. The subspaces can then be evaluated to determine which subspaces have high information and then continue testing only in these subspaces that are associated with high information. Therefore, in step 840, the gradient of each subspace can be compared to a predetermined threshold, and if the gradient is less than the pre-determined threshold, that subspace can be eliminated from further testing. Effectively, this means that the testing that was previously conducted in this subspace was sufficient to accurately predict the response of the RF System under test in this emulated RF environment and further testing will only produce redundant results. Thus, test resources can be devoted to testing other subspaces which are expected to provide more useful information. The predetermined threshold can be selected such that further testing of the subspace can be expected to provide redundant information, For example, the predetermined threshold can represent a gradient where the expected test results would fall within a measure of standard deviation, or the predetermined threshold can represent a gradient selected based on a prior knowledge of the relationship between the tested parameters. Once the subspaces having high information are identified, further testing of the subspaces can continue in step 850. Testing can continue until a completion criteria is met 860. In one embodiment, the completion criteria can be when the confidence level of the results exceeds some predetermined threshold. The confidence level can be defined as the level of confidence that the test results thus far adequately define the relationship between the parameters such that additional testing is not required. In another embodiment, the completion criteria can be based on a costing function as described above. If the completion criteria is not satisfied 865, the gradient of the new test results can be determined as in step 820 and can be used to further limit the search space as steps 830-860 are repeated until the completion criteria is met. It may be emphasized that the above-described embodiments, particularly any "preferred" embodiments, are merely possible examples of implementations, merely set forth for a clear understanding of the principles of the disclosure. Many variations and modifications may be made to the above-described embodiments of the disclosure without departing substantially from the spirit and principles of the disclosure. All such modifications and variations are intended to be included herein within the scope of this disclosure and the present disclosure and protected by the following claims Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a propagated signal or a computer readable medium. The propagated signal is an artificially generated signal, e.g., a machine-generated electrical, optical, or electromagnetic signal that is generated to encode information for transmission to suitable receiver apparatus for execution by a computer. The computer readable medium can be a machine-readable storage device, a machine-readable storage substrate, a memory device, a composition of matter affecting a machine-readable propagated signal, or a combination of one or more of them.

The term "circuitry" encompasses all apparatus, devices, and machines for processing data, including by way of example a programmable processor, a computer, or multiple processors or computers. The circuitry can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described is this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

What is claimed:

1. A method of testing of an RF system in a emulated RF environment comprising the steps of:
    (a) identifying at least two parameters to evaluate for an RF system, wherein a first parameter is an independent variable and a second parameter is a dependent variable;
    (b) testing the RF system by evaluating the at least two parameters across a first search space in a simulated RF environment;
    (c) determining a gradient between the first and second parameters across the first search space;
    (d) dividing the search space into a plurality of subspaces as a function of the determined gradient;
    (e) eliminating a subspace from further testing if the determined gradient for the subspace is less than a predetermined threshold;
    (f) testing the identified at least two parameters in the remaining subspaces that have not been eliminated;
    (g) continuing testing the identified at least two parameters in the remaining subspaces until a completion criteria is met.

2. The method of claim 1 wherein the RF system is at least one of a transmitter, a receiver, a communication network a navigation device a system or a radar system.

3. The method of claim 1 wherein the gradient predetermined threshold is determined as a function of a priori knowledge of the first and second parameter relationship.

4. The method of claim 1 wherein the completion criteria is a costing function.

5. The method of claim 1 wherein the completion criteria is a confidence level.

6. The method of claim 1 wherein the first or second parameter includes a noise component.

7. The method of claim 1 wherein the first parameter is a signal to noise ratio and the second parameter is timing accuracy.

8. The method of claim 1 wherein three parameters are identified and wherein step (c) determines a gradient between the three parameters across the first search space.

9. The method of claim 1 wherein the RF environment is emulated in software and capable of being changed while the at least two parameters are tested.

10. The method of claim 1 wherein the RF system includes a memory containing previous test information including values for at least one of the parameters in the tested RF environment.

11. A system for testing of an RF system in a emulated RF environment, comprising:
    a memory for storing computer readable code;
    an RF environment module operatively coupled to the memory, the module configured to emulate an RF environment in response to control instructions from a feedback control module;
    an RF system under test operatively coupled to the memory;
    a test module operatively coupled to the memory, the module configured to test the RF system by evaluating at least two parameters across a first search space in an emulated RF environment, wherein a first parameter is an independent variable and a second parameter is a dependent variable;
    a feedback control module operatively coupled to the memory, the module configured to:
        determine a gradient between the first and second parameters across the first search space;
        divide the search space into a plurality of subspaces as a function of the determined gradient;
        eliminate a subspace from further testing if the determined gradient for the subspace is less than a predetermined threshold;
        determine if a completion criteria has been met, and if the completion criteria has not been met, control the RF environment module to provide the remaining subspaces for further testing.

12. The system of claim 11 wherein the at least two parameters is selected from the set of RF environment parameters configurable in the RF environment module and RF system under test parameters observable in the RF system under test.

13. The system of claim 11 wherein the completion criteria is a function of a confidence level.

14. The system of claim 11 wherein the completion criteria is a costing function.

15. The system of claim 11 wherein the RF environment module emulates the propagation characteristics for a given terrain and morphology.

16. The system of claim 11, wherein the RF system under tested is implemented in software configured to emulate an actual RF system.

* * * * *